June 26, 1962 — S. H. A. SCHMAUS — 3,040,699
ADJUSTABLE GAUGE POINTER
Filed Oct. 2, 1959 — 2 Sheets-Sheet 2

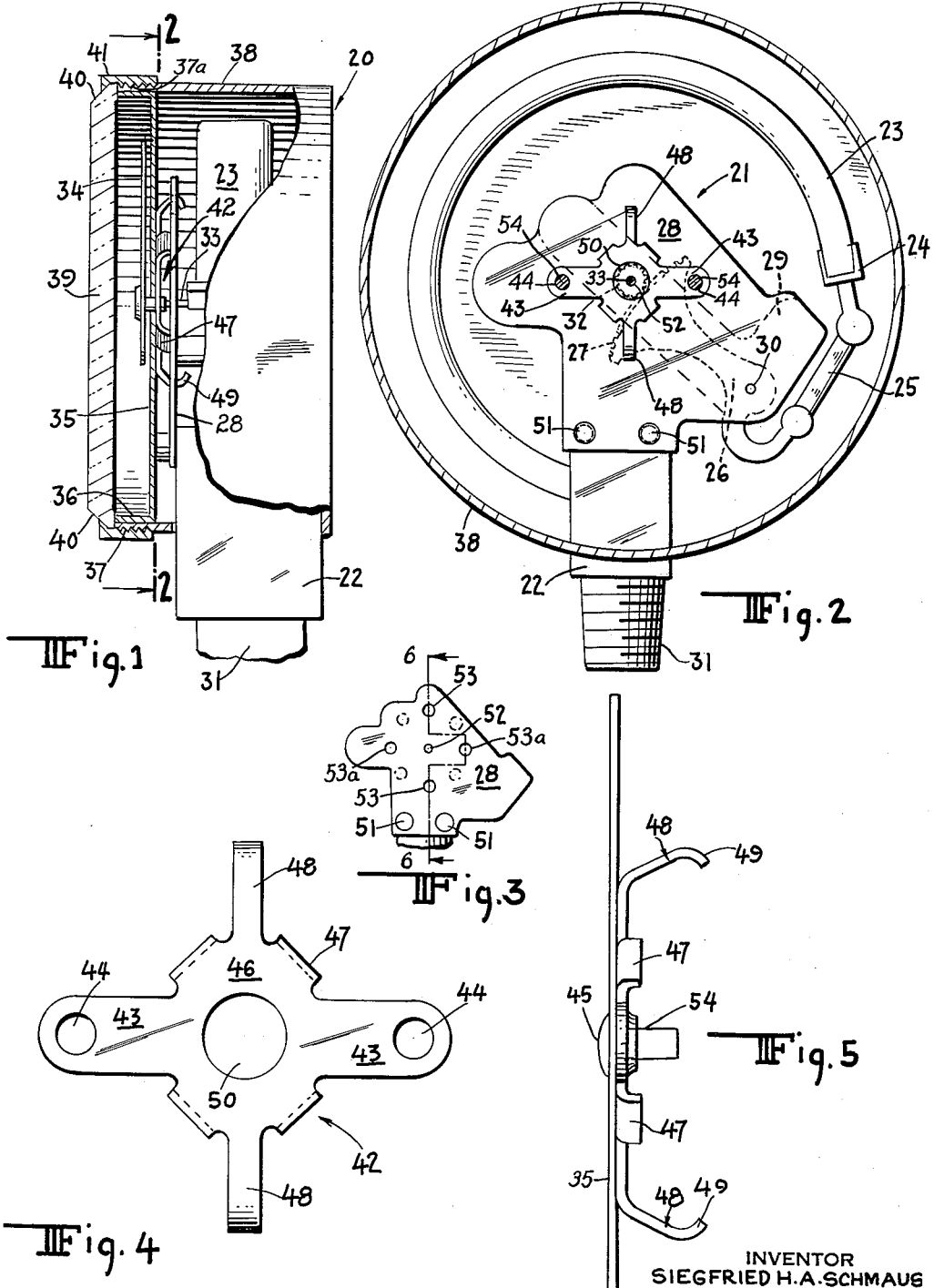

INVENTOR
SIEGFRIED H.A. SCHMAUS
BY
Pollard, Johnston, Smythe & Robertson
ATTORNEYS

United States Patent Office 3,040,699
Patented June 26, 1962

3,040,699
ADJUSTABLE GAUGE POINTER
Siegfried H. A. Schmaus, Philadelphia, Pa., assignor to Ametek, Inc., a corporation of Delaware
Filed Oct. 2, 1959, Ser. No. 844,079
2 Claims. (Cl. 116—129)

This invention relates generally to gauges and more particularly to improvements in pressure gauges employing a dial and pointer.

In pressure gauges, the pressure responsive element or transducer normally rotates a shaft and a pointer attached to it. The pointer moves with respect to a dial which provides a direct reading of the pressure level. This configuration is used in gauges designed for very low absolute pressure or vacuum as well as gauges designed for extremely high pressures such as the pressure level of a compressed or bottled gas.

The dial normally has the same shape and size as the front of the gauge case. Consequently, in order to service the gauge, it may be necessary to remove the dial to expose the movement. To permit removal, the dial is mounted by screws which extend through the dial and engage tapped holes in the movement plate. The screw holes in the plate and the tapped holes in the movement plate must have sufficiently low tolerances to insure a firm mounting of the dial and one that will not shift or loosen during service.

Conventionally, the gauge connection is at the bottom portion of the gauge. Normally the dial is positioned with its bottom portion adjacent the bottom portion of the gauge. Therefore, to properly present the dial to an observer facing it, it is necessary to mount the connection on a vertically extending pipe fitting. When the pipe fitting must be positioned horizontally due to equipment requirements or space limitations, the gauge will obviously be tilted. For this condition, the movement plate must be provided with an additional set of tapped holes so that the dial may be shifted 90 degrees.

One of the objects of the present invention is to provide a gauge in which the dial plate can be placed in a plurality of positions relative to the movement plate. In this way the dial plate is maintained in a predetermined position regardless of the position of the gauge case and connector.

In one aspect of the invention, a clamping means which is mounted on the rear portion of the dial plate is adapted to engage the movement plate in order to position the dial plate at a plurality of relative positions with respect to the movement plate.

In another aspect of the invention, the gauge has a movement plate with a plurality of openings. Mounted on the rear portion of the dial plate is a clamping means which is adapted to engage the openings. By engaging the clamp with the openings, the dial plate is mounted on the movement plate at a plurality of predetermined relative positions.

In another aspect of the invention, the gauge has a movement plate with a plurality of openings. The rear portion of the dial plate is provided with clamping means and locating means, both being adapted to engage the openings. The dial plate may be accurately located at a plurality of positions with respect to the movement plate by engaging the locating means with the openings while the dial is securely mounted on the movement plate by engaging the clamping means with the openings.

Other objects, advantages and features of the invention will become apparent from the following description and drawings which are merely exemplary.

In the drawings:

FIG. 1 is a partial vertical sectional view of the gauge with the rivets and stud portions thereof omitted for clarity.

FIG. 2 is a front sectional view of the interior of the gauge taken along line 2—2 of FIG. 1 in the direction of the arrows.

FIG. 3 is a reduced front elevational view of the front or top movement plate with a plurality of openings.

FIG. 4 is an enlarged front elevational view of the dial clamp.

FIG. 5 is an enlarged side elevational view of the dial clamp secured to the dial plate.

Figure 6:
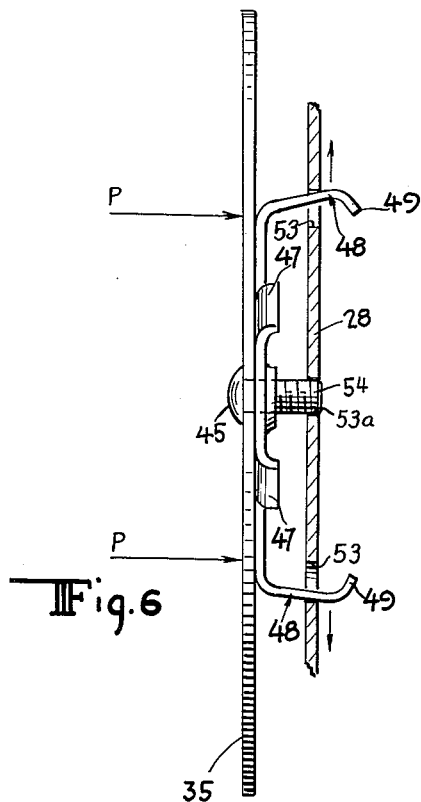
FIG. 6 is an enlarged side elevational view of the dial clamp and plate being engaged with the openings of the movement plate, the latter being shown in section taken along line 6—6 of FIG. 3.

Gauge 20 includes movement 21 mounted upon socket 22 (FIGS. 1 and 2). Movement 21 comprises Bourdon tube 23 extending from socket 22 and having tip 24 at its free end. Link 25 couples tip 24 to segment 26 by means of pivotal connections. Segment 26 includes sector gear 27 and is supported between top movement plate 28 and bottom movement plate 29 by arbor 30. The fluid whose pressure level is to be indicated is connected to an internal passage (not shown) extending from the outer end of threaded connection 31, through socket 22, and thence into the interior portion of Bourdon tube 23. The deflection of Bourdon tube 23 resulting from the applied internal pressure is transmitted through link 25 and causes rotation of segment 26 about arbor 30. The movement of segment 26 swings sector gear 27 which is engaged with pinion 32, supported by the top and bottom plates 28 and 29, respectively. The rotation of pinion 32 is transmitted through extension shaft 33 to operate pointer 34 mounted thereon.

Dial plate 35 is supported by top movement plate 28. Dial plate 35 is provided with cylindrical portion 36 which has substantially the inside diameter of threaded portion 37 adjacent to the front opening of case 38. Cylindrical portion 36 serves to shroud the interior of case 38 from the observer and thus improve the appearance of the gauge. Window 39, having a beveled edge 40, contacts the front edge of threaded portion 37 of case 38 at its rear surface. Window 39 is held in place with respect to case 38 by ring 41 contacting its beveled edge 40. Ring 41 is secured to case 38 by its internal threads 37a.

Dial plate 35 is mounted upon top movement plate 28 by means of dial clamp 42 (FIGS. 4 and 5) which includes tabs 43 containing attachment holes 44. Dial plate 35 is assembled to dial clamp 42 by rivets 45 extending through suitable clearance holes in dial plate 35 and through attachment holes 44 in dial clamp 42. The central portion 46 of dial clamp 42 is in the form of a spider having legs 47 extending rearwardly. Resilient fingers 48 extend from central portion 46 in opposite directions from one another and are provided with hook portions 49 at their outer extremity. Central portion 46 also contains opening 50 that provides the required clearance for extension shaft 33 which passes through dial plate 35.

Top movement plate 28 (FIG. 3) is attached to socket 22 by pins 51. Center opening 52 of top movement plate 28 serves as a bearing for the outer portion of extension shaft 33 to which pointer 34 is attached. A plurality of pairs of clamp openings 53, 53a are disposed in a circle about center opening 52. Each pair of clamp openings 53, 53a is located along a diameter extending through center opening 52.

Figure 7:
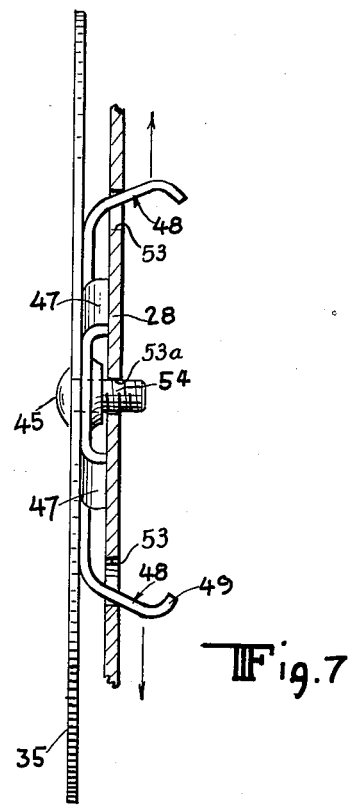
FIG. 7 is a view similar to FIG. 6 with the dial clamp and plate mounted on the movement plate.
Figure 8:
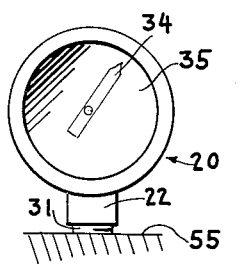
FIGS. 8, 9 and 10 are reduced size elevational views of the gauge mounted with the socket positioned normal to a horizontal, vertical, and inclined plane, respectively.
Figure 9:
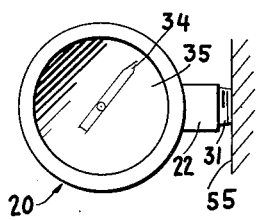
Figure 10:
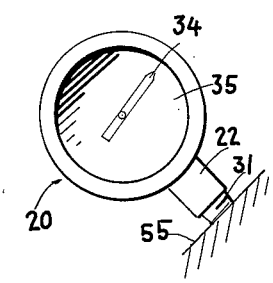

In order to mount dial plate 35 with respect to top movement plate 28 (FIG. 6), the assembly of dial plate 35 and dial clamp 42 is positioned proximate to top movement plate 28 in such a manner that the hook portions 49 of resilient fingers 48 are aligned with clamp openings 53. By applying rearward pressure, as indicated by the arrows P (FIG. 6), to the dial plate and clamp assembly, the outer surfaces of hook portions 49 contact clamp openings 53. Due to their resiliency, fingers 48 deflect and permit dial clamp 42 to be advanced toward top movement plate 28. As dial clamp 42 approaches top movement plate 28, the end surfaces of legs 47 come to rest against the front surface of top movement plate 28 (FIG. 7). The resiliency of fingers 48 causes them to be forced outwardly, thereby locking the dial plate and clamp assembly against top movement plate 28. The abutment of the end surfaces of legs 47 against top movement plate 28 insures that dial plate 35 is positioned substantially parallel to the outer surface of top movement plate 28.

Rivets 45, which secure dial clamp 42 to dial plate 35, have a stud portion 54 extending away from the heads of rivets 45. The diameter of each stud portion 54 is selected to closely fit any one of the clamp openings 53, 53a. Attachment holes 44 in tabs 43 of dial clamp 42 are positioned at a distance from one another and at a right angle to the axis of resilient fingers 48 so that stud portions 54 of rivets 45 may engage the pair of clamp openings 53a disposed at a right angle to the pair of clamp openings 53 engaging resilient fingers 48. In this way, dial clamp 42 and consequently dial plate 35 attached thereto is accurately positioned with respect to top movement plate 28 by the engagement of close fitting stud portions 54 with clamp openings 53a. Such a configuration permits greater tolerance in the fit of the resilient fingers 48 with respect to clamp openings 53. The result of this is that upon assembly, resilient fingers 48 can conveniently be engaged with clamp openings 53 and closing pressure applied to the dial plate and clamp assembly before the accurate positioning of the assembly is established by the engagement of stud portions 54 with clamp openings 53a.

In disassembling gauge 20 in order to expose the front portion of movement 21, it is necessary to initially unscrew ring 41 and remove window 39. The next step in this disassembly is the removal of pointer 34 by the use of a conventional tool. At this point, the application of an outward force to dial plate 35 is sufficient to cause the inward deflection of resilient fingers 48 and consequent disengagement of fingers 48 with clamp openings 53 in top movement plate 28. It is, therefore, evident that the front portion of movement 21 can be exposed for service or adjustment by a relatively few and simple number of operations.

It should be understood that variations can be made in the details of construction without departing from the spirit of the invention, except as defined in the appended claims.

What is claimed is:

1. In combination with a pressure gauge or the like having a movement plate thereon with a pointer shaft extending therethrough, said movement plate having a plurality of spaced openings therethrough concentric with said shaft, a dial plate overlying said movement plate, said dial plate having a plurality of spring fingers in engagement with some of said openings and at least one locating stud in close-fitting engagement with another of said openings.

2. In combination with a pressure gauge or the like having a movement plate thereon with a pointer shaft extending therethrough, said movement plate having a plurality of spaced openings therethrough concentric with said shaft, a dial plate overlying said movement plate, said dial plate having a plurality of spring fingers in engagement with some of said openings, at least one locating stud in close-fitting engagement with another of said openings, and means spacing said dial plate substantially parallel to said movement plate.

References Cited in the file of this patent

UNITED STATES PATENTS

| | | |
|---|---|---|
| 2,516,771 | Herscher | July 25, 1950 |
| 2,541,174 | Neustrand | Feb. 13, 1951 |